Nov. 18, 1952     E. E. MAUREY     2,618,495
PULLEY
Filed Jan. 26, 1948
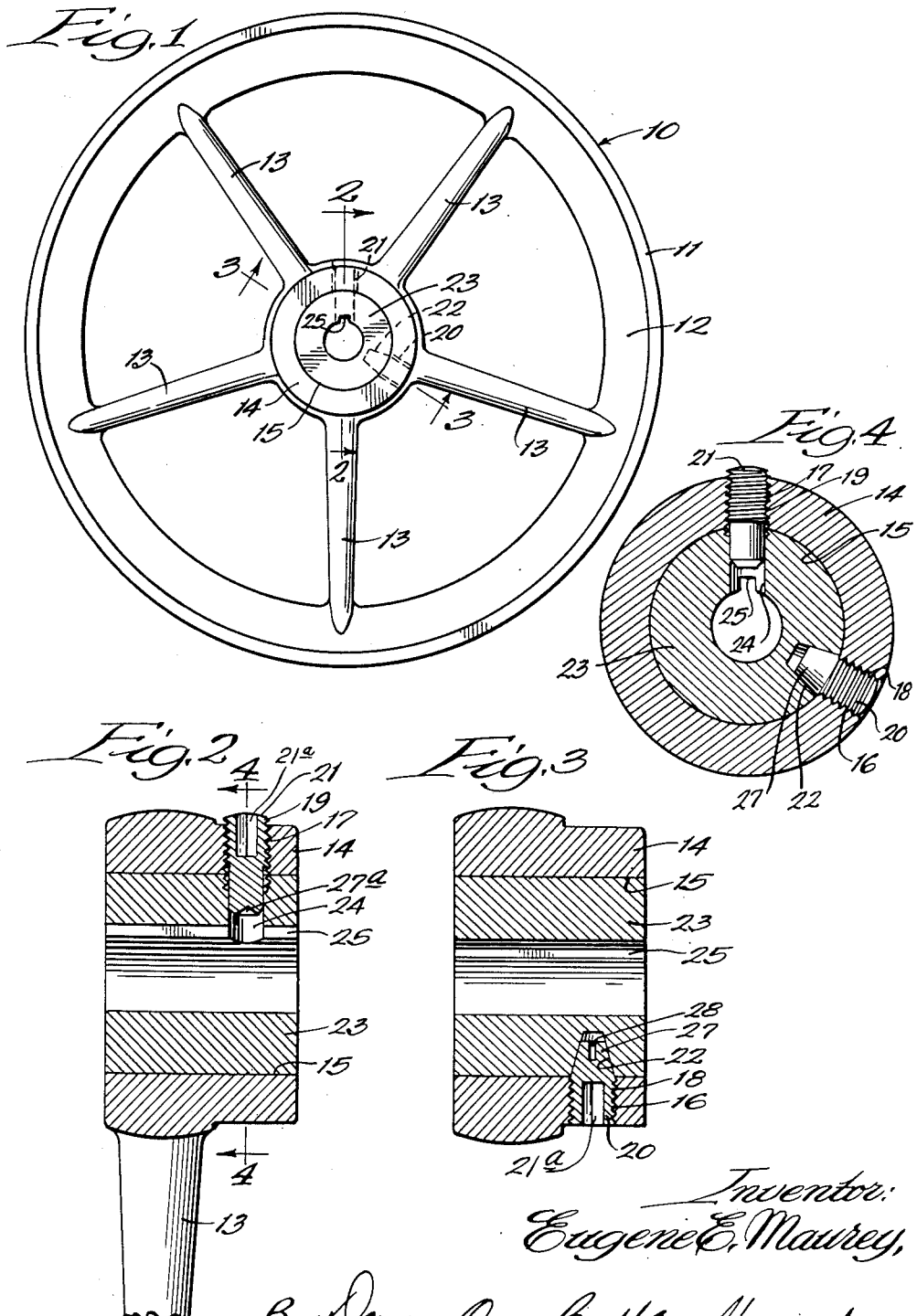

Patented Nov. 18, 1952

2,618,495

UNITED STATES PATENT OFFICE 2,618,495

PULLEY

Eugene E. Maurey, Chicago, Ill.

Application January 26, 1948, Serial No. 4,320

1 Claim. (Cl. 287—52.08)

This invention relates to an improvement in pulleys and especially pulleys wherein a replaceable bushing is employed to adapt the pulley for use with variously dimensioned shafts.

In this manner, variously sized pulleys may be provided with only one or, at most, very few bore sizes in the hub, and for use with these pulleys, a plurality of bushings may be supplied to fit the bore having in themselves variously sized bores to fit any of a large variety of shafts. Thus, the necessity of maintaining a large inventory of pulleys of various sizes, with a large number in each size having variously dimensioned bores, can be eliminated. However, when employing a system of the type described, it is a desideratum that the bushing be readily movable with respect to the bore of the pulley to enable replacement of one bushing for another without allowing so much play as will enable the pulley to wobble or the parts to bind.

The ordinary set screw heretofore employed for securing the parts together is of little value in overcoming the tendency of the pulley to run-out on its shaft, wobble, or to bind so that separation thereof is difficult to effect without the use of special tools. The effective forces of the set screw are radially aligned and are operative mainly to resist relative circumferential and axial movement, but are ineffective for stopping relative angular movement or for imparting such forces as will cause the parts to remain or to return to proper alignment.

It is an object of this invention to produce a pulley employing a replaceable bushing for adapting the pulley to variously dimensioned shafts and in which the means securing the bushing to the pulley operates to prevent the difficulties described.

Another object is to produce a pulley of the type described wherein such forces may be brought into play as will cause realignment of the bushing with the pulley quickly and easily to be effected without employing special tools subsequently to enable the desired relative movement between the assembled parts.

A further object is to produce a pulley of the type described wherein cooperating tapered surfaces forming part of the means securing the pulley on a bushing or shaft prevent relative movement between the assembled parts and cause their realignment in the event that binding takes place between the parts.

These and other objects and advantages of this invention will hereinafter appear, and for purposes of illustration, but not of limitation, an embodiment of the invention is shown in the accompanying drawing in which—

Figure 1 is an end elevation of a pulley embodying the features of this invention;

Figure 2 is a sectional view taken substantially along the line 2—2 of Fig. 1;

Figure 3 is a sectional view of the hub assembly taken along the line 3—3 of Fig. 1; and Figure 4 is a sectional elevational view taken along the line 4—4 of Fig. 2.

I have found that the difficulties described in a pulley employing a replaceable bushing for adapting it to variously sized shafts can be overcome by employing, as the securing means, a set screw having a taper on its end which engages a similarly tapered surface in the receiving recess of the bushing to provide a camming action which, responsive to small turning forces applied to the set screw, creates large force vectors operating in directions other than radial. This causes the bushing or shaft to become or to remain properly aligned and in proper position so that on subsequent removal of the set screw, the inserted bushing or shaft can be easily and quickly removed. The same arrangement of cooperating tapered or cam surfaces can be arranged between other parts to be assembled, such as between the bushing and shaft or the pulley and shaft when an inserted bushing is not employed, or other like assembled parts.

The arrangement of parts embodying the features of my invention are illustrated in a simple pulley assembly shown in the accompanying drawing in which 10 indicates a conventional pulley having a peripheral belt receiving groove 11 formed in a rim 12 connected integrally by spokes 13 to a hub 14. The hub is provided with a central bore 15 extending axially therethrough and a pair of radially extending apertures 16 and 17 which extend through to the bore. Screw threads 18 and 19 respectively formed in the walls of the apertures threadably receive set screws 20 and 21 respectively each having an actuating slot 21a in its outer end wall to be engaged by a suitable wrench or tool.

One of the set screws 20 is adapted to enter a recess 22 in a bushing 23 which slidably fits the hub bore 15, while the other set screw 21 is operative in the hub to extend through the greater portion of an opening 24 in one wall of the bushing to protrude into an axially disposed key-way 25 formed in the inner wall of the bushing to secure the bushing to a fitting shaft. The end of the set screw 21 is formed concave, as at 27a, to effect better contact with the key.

In carrying out the invention, I provide a tapered end portion 27 on the set screw 20 adapted to secure the bushing to the pulley, and I provide a similar taper in the recess 22 into which the tapered end portion of the set screw extends. The recess is formed of such length that the set screw does not engage its end even when in the assembled position. Entry of the end of the set screw 20 into the recess 22 prevents relative longitudinal and circumferential movement between the adjacent parts in the conventional manner, but full engagement between the tapered surface provides a camming action which distributes the forces along force vectors extending axially, radially, and at angles therebetween to resist relative movement between the parts in any direction. Although the extent of conversion of longitudinally applied forces resulting indirectly from turning the set screw to axially or angularly disposed force vectors is somewhat proportional to the angle of incline of the cam surface, it has been found that inclinations or tapers ranging from 20 to 70° with the axis of the set screw are satisfactory and that best results are obtained when the angle is about 30°.

A pulley embodying the features of my invention is prepared for use with a shaft of specific dimension by first selecting a bushing adapted to fit the bore of the hub and having, in itself, a bore size to receive the shaft. The bushing is inserted into the bore until the recess 22 and the opening 24 are in registry with the corresponding apertures 16 and 17 through the hub. The tapered set screw 20 is turned until its tapered end portion enters the recess 22 and the tapered walls engage the similarly tapered walls defining the recess. In this connection, it should be pointed out that ordinarily the end of the set screw is spaced from the base of the recess and the tightening forces which may be applied to the screw are relatively unlimited, and through the cam action tremendous forces can be brought into play. When desired, the end of the tapered section may be provided with a groove 28 to impart resiliency to the tapered portion to insure a firmer gripping action. After the bushing is so mounted in the hub, the pulley assembly may be positioned on the shaft and the other set screw 21 tightened securely to engage the keyed shaft.

It will be evident that in the event that some play has developed between the assembled pulley parts, as when the tapered set screw is loosened or when the parts are secured by means of an ordinary set screw, the pulley may run-out on the shaft, wobble, and the parts will be able to bind to resist their subsequent separation. If the elements embodied in the feature of my invention are employed as the securing means, that is a tapered screw operating in a tapered recess, the parts may be realigned merely by tightening the screw which on engagement with the tapered surfaces defining the recess cams the parts to aligned positions enabling their subsequent separation. If an ordinary set screw has been accidently employed, if may be replaced by one embodying the feature of my invention to effect the same results.

Importance is directed to the simplicity of the invention enabling present equipment readily to be converted to embody the patentable features. It will also be apparent that the reduction of relative movement that is able to take place between the parts in operation will reduce the wear and tear on the parts to prolong their useful life and also provide for smoother and better controlled operations. These same features may be employed for securing other parts together wherein one part is fitted to another and secured thereto in the assembled relation.

It will be understood that numerous changes may be made in the details of construction, arrangement, and operation without departing from the spirit of the invention, especially as defined in the following claim.

I claim for my invention:

A pulley assembly adapted for interchangeably mounting the pulley on variously dimensioned shafts comprising a pulley having a hub portion with a bore extending axially therethrough and a pair of spaced threaded apertures extending radially through the hub, a bushing dimensioned slidably to fit the bore and having a bore dimensioned to fit the particular shaft, a radially extending aperture through the bushing in registry with an aperture through the hub and a radially extending recess having an end portion tapered to provide a frustro-conical cavity in the bushing in registry with the other aperture in the hub when the bushing and hub are in their assembly relation, a securing screw operative in the second aperture through the hub and having an end portion with a taper corresponding to the recess in the bushing to provide a camming action upon engagement when the screw is tightened into the recess, and another securing screw operative in the first aperture through the hub and extending through the registered aperture in the bushing to engage the shaft when in the mounted relation.

EUGENE E. MAUREY.

REFERENCES CITED

The following references are of record in the file of this patent:

UNITED STATES PATENTS

| Number | Name | Date |
| --- | --- | --- |
| 106,756 | Whitmore | Aug. 23, 1870 |
| 366,338 | Baker | Oct. 24, 1882 |
| 506,673 | Crosby | Oct. 17, 1893 |
| 836,706 | Richards | Nov. 27, 1906 |
| 1,442,724 | Hogan | Jan. 16, 1923 |
| 1,596,708 | Bellows | Aug. 17, 1926 |
| 1,940,878 | Olson | Dec. 26, 1933 |
| 2,293,882 | Batchelder | Aug. 25, 1942 |
| 2,300,913 | Flaherty | Nov. 3, 1942 |
| 2,407,160 | Kahn | Sept. 3, 1946 |